3,516,349
PROTEIN HYDROLYSIS
Victor H. Bertullo and Celso Rivada Pereira, both of Sarmieto 487, Buenos Aires, Argentina
No Drawing. Filed Dec. 6, 1966, Ser. No. 599,356
Int. Cl. A23j 1/18
U.S. Cl. 99—14                                    5 Claims

ABSTRACT OF THE DISCLOSURE

The present invention relates to a novel method for the production of protein hydrolyzates by means of a protheolytic yeast, the hydrolyzates serving as a food for human consumption. The form of the product may vary considerably. It may be a dehydrated and degreased powder, a paste, resulting from concentration of the hydrolyzed, unattacked protein, up to a total of solids not under 50%; or a liquid obtained by separation of the hydrolyzed from the non-hydrolyzed protein by mechanical means.

BACKGROUND OF THE INVENTION

The world-wide need for protein of animal origin, both for direct feeding of human beings and for processing into other animal proteins, increases day by day as the human population constantly increases.

Nutritionists of international and national organizations alike are gravely concerned over finding a quick solution to the problems of protein malnutrition, afflicting large masses of population in South America, North America, Africa, Asia and parts of Europe, even more so with the world experiencing a population explosion which it is trying to control. However, the most serious fact is to be able to control as soon as possible the "hunger explosion" which, if it were to occur, will break down all moral and social dams and thus will undoubtedly have a much more devastating effect than a combination of population and nuclear explosions.

It is also a grave concern of scientists working with new techniques in animal nutrition, to obtain a more rapid and efficient production, leaning all the time in the attainment of foods with the basis of greater digestibility, metabolizing energy and productive energy.

Man draws the greater part of land animal proteins from but a thin layer of fertile topsoil a mere six inches thick on the average, which must be constantly cared for and which, by generally uncontrolled erosion of the soil, inadequate use of farming methods, and so on, is constantly being depleted.

Facing this, the sea, with a fertile layer or zone calculated to be on the average about 13,000 feet deep, and occupying two thirds of the globe's area, holds an inexhaustible source of marine proteins, rich in essential amino acids, fundamental for its life, or the life and production of the animals using it.

However, the sea, unending source of protein matter, has fish species which are not usable by man, either because of their size, repulsive appearance, or by lack of knowledge regarding technology of their processing. On the other hand, a substantial percentage of humans do not consume fishery products because of intolerance, ignorance, taboos, habits, or for physiological reasons, and it is therefore of great interest that, in favor of their health and in the economic advantage of the world, they may consume them directly.

This can be done by transforming fish meat into protein concentrates incorporated into other foods forming part of their nutritional habits, for example, added in 3 to 5% to wheat, cassava, rice flours, etc., or in an indirect manner my transforming it into bovine, sheep, hog and poultry proteins and such products thereof as milk, meat and eggs.

Producers and processors of foods for domestic animals desire that protein concentrates in the form of flours which they use should have high digestibility and biological efficiency, and that the product should be economically available, although they will not hesitate at paying a higher price if results obtained are compensating. In other words, they are ready to pay more for a protein concentrate having a digestibility above 92%, a consistent protein content and high values in available lysine and methionine.

Predigestion or hydrolysis of proteins by chemical means, whether acid or alkaline, is considered inconvenient due to racemisation of the amino acids, which then lose, or becoming inactive, their biological value.

Something similar happens with the processing of fishmeal by conventional means, which upon coagulating, precipitating and burning proteins by heating, cause the final product to lose a great part of its value. Apart from this processing, in which glutinous water or glue water (steakwater) is eliminated, losses of 40 to 50% of Cl, Na- and K-ions and of 20 to 30% of P, Mg and Ca are caused, as reported by R. A. McCance and H. L. Shipp in "The Chemistry of Flesh Foods and Their Losses on Cooking," Med. Re. Council, Sp. Rpt. Series No. 187, 1933.

Hydrolysis of animal or vegetable proteins, that is to say, passage to liquid phase of the products obtained by cleavage, such as polypeptides and amino acids, is a desirable fact and may be obtained by means of Bio-Proteo-Catenolysis (B.P.C.). The term means "Biological Breakdown of the Protein Chain" on the basis of the action of a proteolytic yeast and will, in the following, be referred to simply by proteolysis. The particular proteolytic yeast in question, following E. M. Mrak and H. J. Phaff ("Yeast," Annual Review of Microbiology, 2:1–46, 1948), was classified as follows: family "Endomycetaceae;" sub-family "Saccharomycetae;" tribe "Hansenula;" subgenus "Hansenula." The inventors propose for such yeast (and will so designate it hereinafter) the name of "*Hansenula montevideo,* n.sp. (Bertullo)."

A deposit of the culture of this yeast has been made at the Veterinary School of Montevideo, University of the Republic of Uruguay, on or about Apr. 26, 1966, and has been assigned to the Number L. 1.042.

THE INVENTION

According to the present invention, protein of fish, mollusks and crustaceans is hydrolyzed to between 60 and 75% depending upon the species worked upon. Hydrolysis is effected by acting on protein material of the type mentioned with the specific yeast at temperatures between 32 and 34° C. for a period ranging from 18 to 24 hours with constant stirring.

This hydrolysis according to the invention is effective with oily species such as, for example, Anchovy (*Engraulis ringens*) of the Pacific Ocean; "Lacha" (*Brevoortia tyrannus*) of Southwestern Atlantic waters, and lean species such as the Hake (Urophycis spp.) of the North-American Atlantic waters, or the Whiting (*Merluccius merluccius hubbsi*) of the Southwest Atlantic, or the Pacific-Ocean Hake (*Merluccius gayi*).

According to the invention, hydrolysis is also effected in a similar percentage if the meat of cetaceans (Balaenopterae spp.) of the South Atlantic is processed. The method may also be used for the hydrolysis of proteins of animal origin from domestic animals, their internal organs, blood and products such as milk, eggs, etc., intended for nutrition.

The method of the present invention also serves to hydrolyze vegetable proteins brought to suitable humidity conditions, among them the soybean (*Glycine max*) or the flours thereof, and other Leguminosae, such as peanut (*Arachis hypogaea*), chick-pea (*Cicer arietinum*), lentil (*Lens esculenta*), kidney bean (*Phaseolus vulgaris*), broad bean (*Vicia faba*), etc., or fresh or dried alfalfa (*Medicago sativa*) in combination with a fermentable carbohydrate, any of them either pure or mixed with fresh ground fish, in different proportions.

Hydrosoluble protein was determined according to the official methods of the AOAC, 9th ed. 1960, as well as by the methods recommended by C. F. Lee: "Preparation of a Dry Product from Condensed Menhaden Solubles," U.S. Dept. of the Interior, Fd. WL Service, Res. Rep. No. 45/956.

The present invention provides a method for the production of polypeptide and amino acids, to which incidentally should be added members of the vitamin B complex, which are processed per se by the yeast, apart from the trace elements are micro-elements, so important in modern nutrition, and the hormones that the several animal and vegetable forms possess, and the presence, in the case of fish, of the "fish factor" which is maintained wholly in the final product.

The present invention, upon effecting the proteolysis by means of *Hansenula montevideo* n.sp., does not cause crystallization of the hydrolyzed products as they are formed during hydrolysis, as occurs with other methods.

On the basis of the present invention, when hydrolyzing by proteolysis, for example, fish meat with a solids content varying between 25 and 32% by means of proteolytic yeast *H. m.* n.sp. (to be used hereinafter in lieu of "*Hansenula montevideo* n.sp.," for the sake of brevity), putrefaction that might be occasioned by means of marine bacteria of the fish or of such bacteria contaminating the fish during capture, storage, handling, and marketing, is controlled from the very start. Bacteria in the mucus of fish skin, gills and intestines start disappearing after 8 to 10 hours, once the yeast has developed vigorously in a medium favorable thereto. Action of the yeast is carried out both on gram-negative bacteria of marine origin, and on gram-negative or gram-positive bacteria which may contaminate fish with the presence of a 7 to 10% of sucrose with a content of 97 to 98% as energy source.

The present invention, on the basis of proteolytic action of the yeast *H. m.* n.sp., by being developed at temperatures not above 35° C., does not racemize any free amino acid, allowing for example that lysine be recovered as "available lysine" in not less than 80%, according to the method of Carpenter and associates (K. J. Carpenter: "'Corrected Straight-Acid Procedure' for Determination of 'Available Lysine' in Foods," Bioch. J., 77:604–8, 1960.

It is the first hydrolysis product that allows using the Carpenter technique, thus indicating that biological action does not affect combination of the fluorodinitrobenzene (FDNB) formed in the reaction.

In addition to the forms mentioned above in the abstract of the disclosure, the following uses are available for the products of the invention: "fermented fish sauces" similar to the Vietnamese "nuoc-man"; food for the animal species, under the form of degreased or undegreased powder, by mechanical and/or chemical means, with prior separation of bones and scales which are dried for the production of fertilizers; a liquid additive which, incorporated into feed rations, provides the protein nutritive principles.

The product can also be used as a builder, on the basis of its metabolism, of anti-microbial, substances, as has been proven upon hydrolyzing with the yeast mollusk meat, fish, or vegetable proteins such as soybean or alfalfa plants, extracting the liquid phase and testing the potency thereof on pathogenic germs and saprophytes.

PREFERRED EMBODIMENTS OF THE INVENTION (1) The present invention of proteolysis by proteolytic yeast *H. m.* n.sp. has the following flow-sheet which is in substance the same for different preparations, but showing slight modifications which shall be indicated and noted according to the several uses of the product.

The proteolysis processing of fish for animal use is illustrated by the following flow-sheet in which the several steps or operations are listed:

(1) Grinding of the product, namely fish or residues thereof;
(2) Adding of a fermentable carbohydrate in about 7 to 10% by weight of the total amount;
(3) Mixing of the ingredients and placing them in a fermenter;
(4) Adjusting the temperature to between 28 and 35° C.;
(5) Adding of the *H. m.* n.sp. yeast culture, after reaching the right temperature;
(6) Stirring of the mass at 40 to 55 r.p.m.;
(7) Carrying on hydrolysis for 18 to 24 hours or more;
(8) Filtering and separating of solids;
(9) Degreasing by mechanical means;
(10) Concentrating the solids to 50%;
(11) Drying; and
(12) Packing in sacks and storing.

It is mandatory that the fish or residues of fish be absolutely fresh, so as to obtain a product suitable for animal consumption. The pH should not be in excess of 7.

Grinding (operation 1) for a satisfactory hydrolysis must be as fine as possible, so as to expedite the proteolytic action of the yeast. The addition of fermentable carbohydrate (operation 2) may be carried out on the basis of commercial sucrose of 98% purity, or with any other fermentable sugar, except lactose which is not used nor fermented by the yeast *H. m.* n.sp. The fermentable carbohydrate may be incorporated in a percentage varying between 7 and 10% according to the type and nature of the fish to be hydrolyzed.

The mixing of fish and carbohydrate (operation 3) must be intimate, and it should reach the desired temperature before seeding of the yeast culture (operation 5) is effected. Continuous stirring (operation 6) is essential to expedite hydrolysis which will be copleted in about 30 to 48 hours( operation 7) according to the type of fish employed. Filtering (operation 8) is effected to separate scales and bones not digested in the above period of time; these byproducts may be used for manufacture of organic fertilizers. If desired, the product may be degreased by centrifugation at a temperature of 40° C. (operation 9).

The hydrolyzate, consisting of protein, amino acids and polypeptids, is then concentrated (operation 10) to about 50% of solids by vacuum concentration at a temperature not above 40° C., and then dried by any of several known methods (operation 11). The resulting final product is a fine, pleasant smelling powder having a crude protein yield varying between 54 and 60%.

(2) For proteolysis processing with other animal proteins, the operations are carried out in a similar manner, adjusting them according to the desired final product. For example, if working with meat residues of bovine origin, the liquid phase may be extracted from the hydrolyzed product, which, suitably concentrated, renders a meat extract with a final yield estimated at 10% of the raw material.

(3) The method of the invention has proved to be useful in the fleshing of bovine and sheet hides, by simply maintaining the hides during 24 hours in contact with the yeast and a fermentable carbohydrate. This operation enables cleaning of hides, avoiding cuts which may occur when fleshing is carried out with sharp instruments.

(4) The present invention permits to achieve preservation of other slaughterhouse residues, such as, for example: organs such as lungs, blood, etc. In the case of blood, it is enough to place this element in the presence of the fermentable carbohydrate and the yeast culture whereby the blood, upon the start of hydrolysis thereof, will be indefinitely preserved. This has the advantage that small quantities can be made use of, without the need of complicated apparatus or devices, since it is only necessary to have a suitable vessel for transporting the blood for its further processing, with no need at all of adding preservatives, or of applying heat or cold. Blood suitably handled becomes totally hydrolyzed, and is thus adapted for various industrial uses.

The proteolysis method of the present invention catenolyzes animal parasites transmissible to the human being and makes them harmless. For example: fertile cysts of *Taenia echinococcus* (from sheep) are proteolyzed in the presence of the yeast and a fermentable sugar, thereby allowing integral utilization of parasited meats and organs with no alteration of the biological properties thereof, as it is usual to occur with extensive cooking and subsequent drying. Tests carried out in vitro show that the cyst membrane and the scolex hooks are hydrolyzed and digested. Tests carried out is vivo on dogs fed with proteolysis products derived from sheep liver thus treated showed that the animals had not contracted the parasitosis after three months of eating the product. No sensitivization of the dogs was found.

(5) The present invention permits to catenolize mixtures of animal and vegetable proteins. For example, equal quantities of fish and alfalfa are mixed, the fermentable carbohydrate and the yeast are added, and the resulting hydrolysis renders as a result a final product with a total of 30 to 32% of crude proteins, up to 75% of which are hydrosoluble. The mixture dries readily and can be used as a protein concentrate for ruminants.

(6) The present invention also catenolizes vegetable proteins. In the case of alfalfa, hydrolysis occurs between 18 and 24 hours, simply by adding to the ground fresh product the yeast and the fermentable carbohydrate. There is no loss of organic nitrogen and the product dries readily; for this reason, it is an excellent substitute for silo fermentation, wherein loss of nitrogen is considerable, spoiling of the fodder may occur, and large storage facilities and an extended fermentation time under high temperature are needed. In working according to the invention, temperature never rises beyond 35° C., thereby insuring integrity of the protein of the cleavage products thereof. In the case of soy or soybean, it is necessary to hydrate the product, grind it and bring it to the aforementioned fermentation conditions. The final product is a homogeneous mass with a bland ripe apple odor; if allowed ot settle, the mass will separate into two phases: an amber colored liquid phase, and a creamy white solid phase. During hydrolysis, antitrypsic and rat growth-inhibiting factors disappear.

(7) The cud content of domestic ruminants can also be hydrolyzed by proteolysis under similar conditions as stated before, with the only requirement being the mixing of the cud with the yeast and a fermentable carbohydrate, and once hydrolysis is completed the animals are fed back the cud, or it is dried. Thus protein not previously digested by the ruminants is fully utilized.

(8) For proteolysis processing for human consumption, the hydrolysis process is fundamentally the same, its technology varying according to whether it is desired to prepare the product as a liquid, a paste or a powder. The process flowsheet is the same as explained under paragraph 1 to the grinding operation (1), adding of fermentable carbohydrates (2), mixing of ingredients and introducing in a fermenter (3), raising of temperature to 28 to 35° C. (4), adding of the yeast culture in an amount not below two million live cells per ml. in the amount of 1 liter of suspension of the yield per ton of the product to be treated (5), stirring of the mass at 30 to 55 r.p.m. (6), hydrolysis between 18 and 24 hours (7) and filtration as well as separation of solids (8).

In the case of the processing of liquid proteolysis products, after operation 8, to obtain the liquid phase of the product consisting of free amino acids and polypeptides, with a nitrogen content varying between 15 and 22 grams per liter, gravity sedimentation may be performed at an environmental temperature not exceeding 25° C. but this procedure takes a lot of time.

Another method is to use centrifuges which separate the solids in continuous production at a speed not below 2,800 r.p.m., a liquid being thereby produced, having a specific gravity varying between 1,055 and 1,115, with a color between light yellow and dark brown, depending on the species of fish used. The product has a specific odor, is stable at ambient temperature, similar in taste, physical appearance and nitrogen yield to the "nuoc-man" or "fermented fish sauce" widely used in the Far East.

The final product may be salted to conform to the taste and dietary customs of the people of the Far East although this is not necessary for preservation purposes. The inventive proteolysis method by means of the protolytic yeast H.m. n.sp. (still identifying the *Hansenula montevideo* n.sp. (Bertullo)) permits manufacture of the product similar to the "nuoc-man" in no more than three days, while following the classical method production takes between three and eighteen months. It is obvious that the method of the invention is considerably more practical, economical, and requires a lower outlay of initial capital.

The product thus obtained is rich in free amino acids and polypeptides, can be preserved indefinitely without additive, or else may have added sodium chloride in the proportion of 10% weight-volume so as to provide it with the taste to which the consumer of "nuoc-man" is accustomed. The color will range between light yellow and dark brown, depending on the type of fish used.

(9) For production of fermented fish sauces of the "baggong" type, widely used in the Philippine Islands, processing is continued after operation 8, that is to say, after filtering and separating of solids, concentrating the resulting product down to a solids content of 55 to 60%, of else concentration of the residue remaining after obtaining the liquid product described above under paragraph 7 is carried out up to a similar percentage.

The fish paste can be preserved by itself, although addition of sodium chloride in the proportion of 10% weight-volume is recommended on account of the fact that consumers are accustomed to eat it with salt.

In both products, liquid phase and paste, salting of the product is carried out after the process is completed, this being an additional advantage over classical methods wherein the fish—to prevent starting of putrefaction—is salted from the beginning, which requires a larger consumption of salt, on the one hand, and leaves a highly salted residue, on the other hand, while by means of the present invention, on salting only the portion to be used for human consumption, the saltless residue may be used in different applications without the limitations imposed by the salt.

(10) For the processing of fish protein concentrates, the present invention uses the same operations listed hereinbefore under paragraph 1, until a concentration of solids of 50% is reached, whereafter dehydration and full degreasing are carried out by means of polar solvents of the type of 99% isopropanol which extracts fatty matter at low temperatures, dehydrating the product at the same time. Said solvent does not affect essential amino acids, or choline, or the phospholipids, or the phosphoproteins; a final product is thus attained having a protein content between 70 and 80% depending on the fish species used, with a grayish to creamy white color, also depending on the type of fish.

The product is odorless, has a lightly pungent taste due to the free amino acids, with a fatty content not exceeding 0.05%. Impairment of taste due to elimination of volatile amines is not observed. The moisture content of the product is between 4 and 5% and may be preserved indefinitely under normal storage conditions in cellophane or bags of similar material.

The product leaves a residue of crude fatty matter which may be used for various industrial applications, as well as a residue of scales and bones which, adequately dried, may be used as organic fertilizer. The product thus obtained, in a percentage of 7%, has the following composition: N:P:Ca:K=7:20:20:2, plus a series of microelements all of which remain in part of the digested protein, adhering to the scales and bones.

The proteolysis product in powder form made according to the present invention has been tested from a toxicologic and microbiologic point of view in laboratory animals for extended periods of time. No toxicity has been found and the microbiol count remained beneath the limits set by the FAO for these products. Test animals used were white mice, albino rats, and chicks. Microbiological techniques were effected in the conventional slide counting.

The proteolysis product in powder form for human consumption has been tested by pediatricians in premature and distrophic children; in a proportion of 1.5 to 2 grams per kilogram weight of the premature children, with promising results as to tolerance and fixation of organic nitrogen; and in larger proportions in the case of distrophic children, with similar results.

Primary tests show ingestion and retention tolerance with no secondary disorders of any kind. The product has also been used on old people, with good results, and it is thus considered that it is a useful, active aid both in pediatrics and in geriatrics.

The present invention makes *Hansenula montevideo* n.sp. capable to hydrolyze determined marine animal proteins, either mollusks, crustaceans or fish, in the presence of a fermentable carbohydrate, excepting lactose, and to produce an active principle extractable by means of certain organic alcohols. The protein substances according to the invention have proved to possess antibiotic properties.

The anti-microbial substances have been tested on staphylococci (*Staphylococcus aureus*. Strain, Wood 46 NCTC No. 7121; *Micrococcus pyogenes*. Var. aureus, ATCC No. 6538) and on other bacteria such as *Bacillus subtilis* ATCC No. 6633, *Escherichia coli, Salmonella gallinarum, Bacillus pyocianicus*, both in the disc method, in gradient or in dilution, showing a great inhibitory potency.

The anti-microbial substance is heat-stable, nondialyzable, diffuses widely in solid and liquid media, is hydrosoluble and shows no toxicity according to laboratory techniques employed on white mice, albino rats and rabbits.

A similar product may be obtained from vegetable proteins, such as soybean or alfalfa, due to the metabolic action, in the presence of proteins placed in determined conditions of temperature, stirring and hydrolysis, of the new microbial element *H. m.* n.sp. The resulting product is of low molecular weight and has been classified by laboratory tests as belonging to the group of histolyzed polypeptides.

The proteolytic yeast *H. m.* n.sp., isolated from the abdominal cavity, preferably the liver surface of Hake (*Merluccius merluccius hubbsi*) from the South Atlantic Ocean, controlling the process of proteolysis answers the following description:

(1) *Characteristics of vegetative reproduction.*—All cultures were developed at 25° C. unless otherwise stated, and following the techniques suggested by Lodder and Kreger—Van Rij: "The Yeasts, a Taxonomic Study"; Amsterdam, North-Holland Publ., 1952. The culture media and sugars used were from Difco Laboratories, a U.S.-American company, and the salts were from Merck, Germany.

(a) Potato agar: Good growth and reproduction after 48 hours. Conglomerates of varying sizes, typical of the yeast, are observed. After four days, central and/or polar vacuoles, generally spherical in form. Germination occurs by gemmation, preferably at the poles.

(b) Corn flour-agar: Similar gemmation.

(c) In peptone-sucrose nutrient (proteose-peptone No. 3, 1%; sucrose, 2%; meat extract, 1%; distilled water, 100 ml.; pH, 7 to 7.2): Characteristic polar growths; gemmation, similar to (a) and (b).

(2) *Shape and size of cells.*—In a culture medium of malt extract, potato agar and corn flour-agar: average size, 5 x 3 microns, chains of 2, 3 and 4 elements being found, the first two being the more frequent ones.

(3) *Formation of spores.*—Studied on Gorodkova agar, blocks of gypsum and carrot butts: (a) number of spores per cell: 1 and 2, very frequent; 3 rare; (b) location: when one, central; when two, symmetric and in the direction of the main axis of the yeast; when three, in a triangle.

(4) *Properties of the ascospores.*—
(a) Shape: spherical.
(b) Appearance: Refringent and clear spheres.
(c) Partitioning: None shown.
(d) Wrinkling of edges: None shown.
(e) Wrinkling of walls: None shown.
(f) Presence of grease drops: None shown.
(g) Size: 3 microns in diameter.

(5) *Morphological features of the cultures.*—
(a) Malt extract: White deposit, with abundant sediment. Clean supernatant liquid. Fermentation of the medium during the first four days.
(b) In peptone-sucrose nutrient (formula of 1 c.), hereinabove: Abundant sediment, with white deposit, with fermentation of the medium during the first two days.
(c) In agar-malt plus 2% calcium carbonate, and in malt-gelatine: Colonies, 8 days: smooth, bright, irregular edges, white with slightly grayish tinge, vigorous and raised; 30 days: white with slightly gray tinge, bright, scalloped and irregular edges; 60 days: same condition and appearance.

(6) *Physiological properties.*—
(a) Film formation in liquid medium: Forms thin film in an extract of malt medium and also at 17° C. after 30 days. The film adheres strongly to the walls of the test tube.
(b) Fermentation of sugars: The tests were carried out in Durham tubes and also with the method of Guerra. Observations were taken after 24 hours, after 48 hours and after 10 days. Fermenting: glucose and maltose, normal; galactose and sucrose, very strongly. Non fermenting: lactose. With the Van Iterson-Kluyver fermentameter, in the presence of 4% of raffinose: ⅓ after 24 hours; total after 48 hours.
(c) Assimilation of sugars: In liquid medium and by auxanography: in the former and after 30 days: positive: glucose, galactose, sucrose and maltose. No assimilation: lactose. In the latter, the same results after three days.
(d) Assimilation of nitrates: In liquid medium, with ammonium sulfate: positive. By auxanography: (a) mineral nitrogen, potassium nitrate, sodium nitrate and ammonium sulfate: positive; (b) peptones (Bacto-peptone, White peptone and Bacto-tryptose): positive; (c) urea: positive.
(e) Ethanol as only source of carbon: Positive, after 8 days.
(f) Cleavage of arbutin and aesculin: Positive, after 48 hours; very positive, after 4 days.
(g) Production of carotenoid pigments: Negative.
(h) Production of compounds similar to starch: Negative.
(i) Production of esters: Positive.
(j) Reaction in litmus milk: No change after 8 and 30 days.

(k) Cleavage of greases: Negative.

(l) Acid production: Negative after 8 and 30 days.

(m) Proteolysis: Positive: (a) in alkaline-egg medium (The Manual of Microbiological Methods, American Soc. of Bacteriologists, pp. 55–56, 1957) with 1% sucrose: ¼% after 24 hours, complete after 48 hours; (b) hydrolysis of gelatine: 12% gelatine, 1% sucrose: complete after 10 days.

Speaking in general terms, the present invention requires that for each metric ton of fish or any other protein it is intended to hydrolyze, apart from the addition of the fermentable source provided by a carbohydrate, for example commercial sucrose, at least one liter of the cultures of *Hansenula montevideo* n.sp. with a yield of not less than two million viable cells per milliliter should be added, a greater amount being admissible with no inconvenience at all.

The cultures may be added either with the nutrient medium in which they were produced, or else prepared in the usual commercial manner, previously diluted so as to facilitate dispersion. Cultures can be maintained viable for a considerable period of time, the only requirement being that they should be kept at a suitable temperature, for example, not above 4° C.

Further to all hereinbefore set forth, it will be apparent that in putting into practice the present invention, various modifications, changes or improvements thereof may be introduced thereto without departing from the fundamental principles of the invention, as set out in the appended claims.

What we claim is:

1. A method for the production of protein hydrolyzates, comprising the steps of hydrolyzing protein materials, both of animal and vegetable origin, by means of a proteolytic yeast *Hansenula montevideo* n.sp., in the presence of a fermentable sugar, the hydrolysis being carried out in such a manner that per metric ton of protein material at least one liter of the cultures of *Hansenula montevideo* n.sp. are added, with a yield of not less than two million viable cells per milliliter, and recovering the hydrolyzate.

2. The method as defined in claim 1, wherein the amount of fermentable sugar is in the range of 7 to 10% by weight of the total mixture.

3. The method as defined in claim 2, wherein the mixture is fermented at a constant temperature between 30 and 32° C. and constantly stirred by mechanical means at a speed of 35 to 40 r.p.m. for a period of time ranging from 18 to 24 hours.

4. The method as defined in claim 3, wherein the biological hydrolysis is carried out until a liquid product is obtained containing from 60 to 65% by weight of free amino acids and polypeptides, which is subjected to filtration for separating the solids, comprising scales and bones, from the liquid portions, whereafter said portion is concentrated and dried for direct use as an additive.

5. The method as defined in claim 4, wherein the completion of the biological hydrolysis is determined by the amount of sugar found in the product being not more than 0.1% and the pH having reached a stable value of 5.8 to 6.0.

References Cited

UNITED STATES PATENTS

| | | | |
|---|---|---|---|
| 1,851,253 | 3/1932 | Kahn | 99—18 |
| 2,536,171 | 1/1951 | Hall et al. | 195—29 |
| 3,000,789 | 9/1961 | Bertullo et al. | 19—14 XR |

OTHER REFERENCES

Wickerham et al., Bacteriology Review, vol. 26, 1962, page 386.

MAURICE W. GREENSTEIN, Primary Examiner

U.S. Cl. X.R.

99—17, 18; 195—80, 82

UNITED STATES PATENT OFFICE
CERTIFICATE OF CORRECTION

Patent No. 3,516,349           Dated June 23, 1970

Inventor(s) Victor H. Bertullo et al.

It is certified that error appears in the above-identified patent and that said Letters Patent are hereby corrected as shown below:

In the inner title, the post-office address of the inventors should correctly read -- Sarmiento -- rather than "Sarmieto";

column 2, line 16, "or" should be -- on --;

same column, line 46, "to" should be deleted;

column 3, line 69 (numbered 71), the comma should be deleted after "anti-microbial";

column 5, line 23, "is vivo" should correctly read -- in vivo --;

column 10, line 17 (claim 4, line 6), "liquid portions," should correctly read -- liquid portion, --.

SIGNED AND
SEALED
OCT 6 - 1970

(SEAL)
Attest:

Edward M. Fletcher, Jr.
Attesting Officer

WILLIAM E. SCHUYLER, JR.
Commissioner of Patents

UNITED STATES PATENT OFFICE

CERTIFICATE OF CORRECTION

Patent No. 3,516,349                          June 23, 1970

Victor H. Bertullo et al.

It is certified that error appears in the above identified patent and that said Letters Patent are hereby corrected as shown below:

Column 8, lines 33 and 34, "(formula of 1 c.), hereinabove:" should read -- (formula of (1) (c), hereinabove): --.

Signed and sealed this 10th day of November 1970.

SEAL)

Attest:

Edward M. Fletcher, Jr.                       WILLIAM E. SCHUYLER, JR.

Attesting Officer                                    Commissioner of Patents